Figure 1:
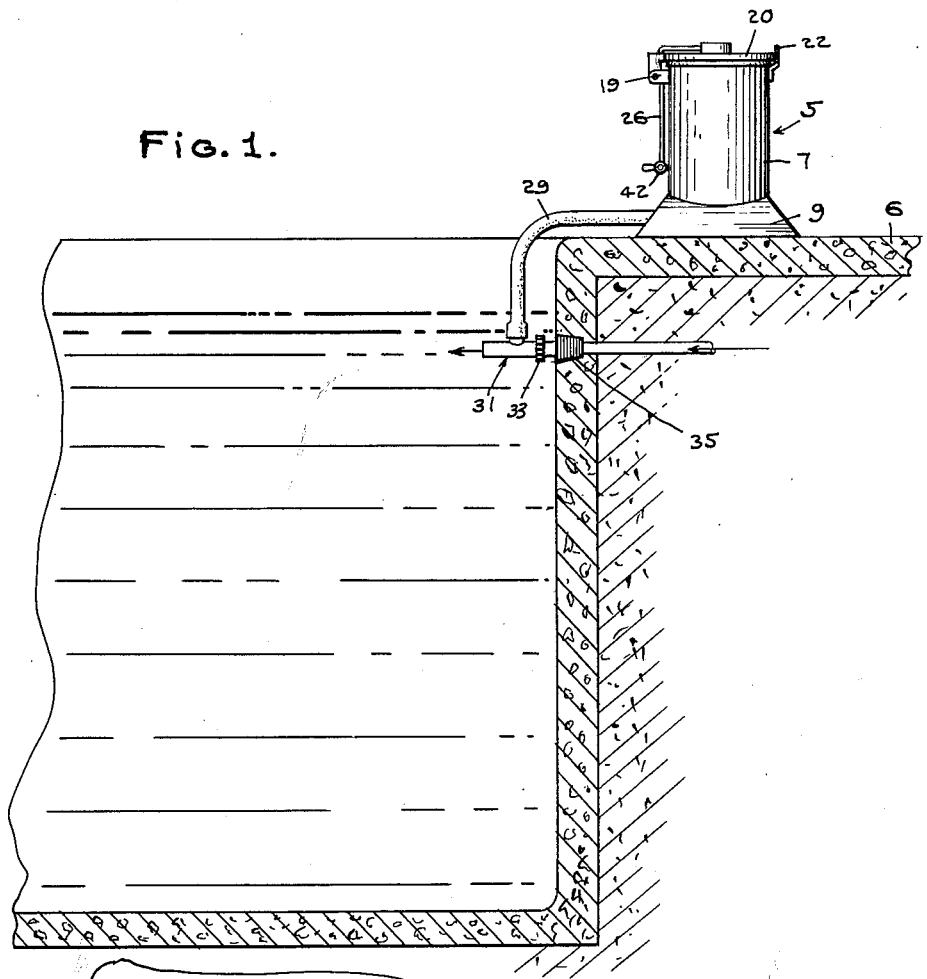

April 14, 1964   J. W. DICKEY, JR., ET AL   3,129,172
AUTOMATIC SWIMMING POOL CHLORINATOR
Filed Aug. 22, 1960   2 Sheets-Sheet 1

INVENTORS
JAMES W. DICKEY, JR.
CARL E. MALONE,
BY
ATTORNEY

April 14, 1964  J. W. DICKEY, JR., ET AL  3,129,172
AUTOMATIC SWIMMING POOL CHLORINATOR
Filed Aug. 22, 1960  2 Sheets-Sheet 2
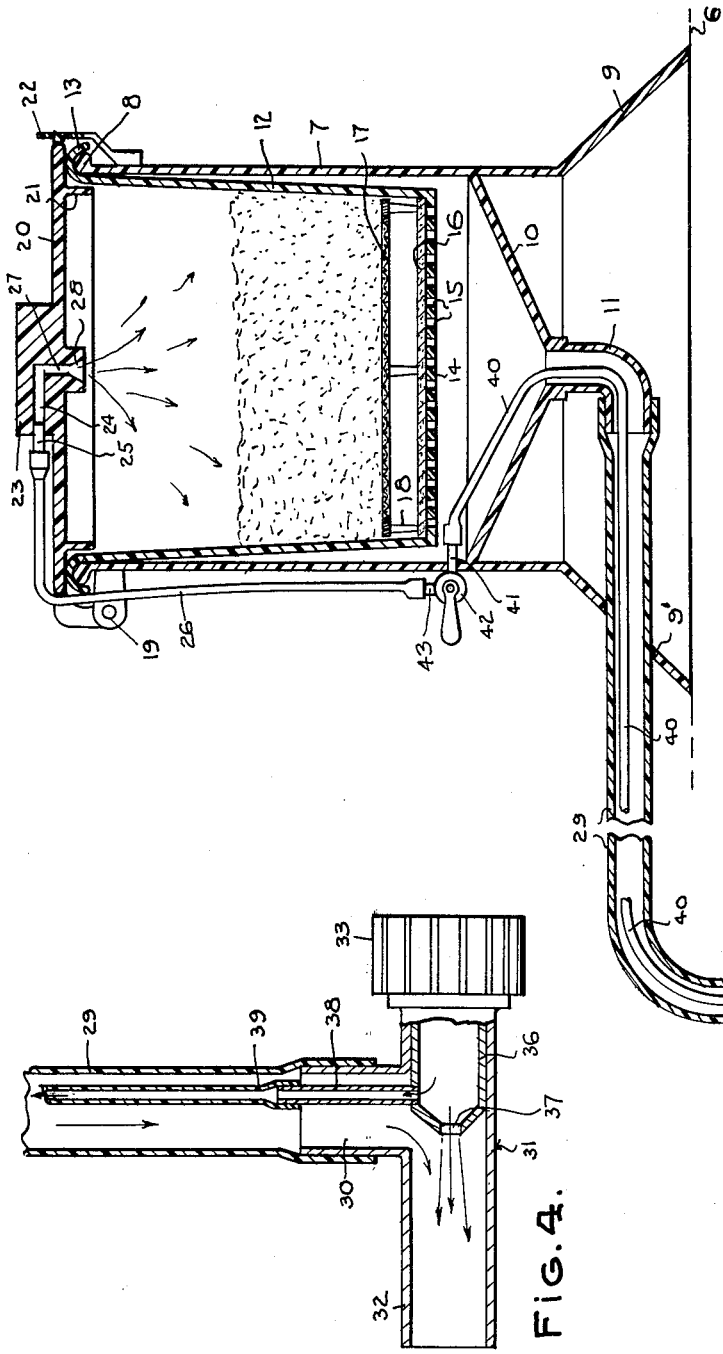
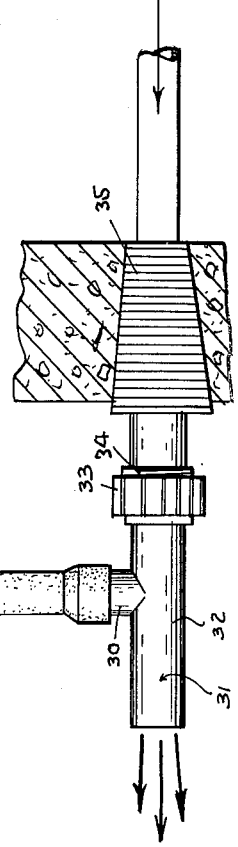
INVENTORS
JAMES W. DICKEY, JR.
BY CARL E. MALONE,
ATTORNEY

United States Patent Office 3,129,172
Patented Apr. 14, 1964

3,129,172
AUTOMATIC SWIMMING POOL CHLORINATOR
James W. Dickey, Jr., 11 SW. 16th St., and Carl E. Malone, 2281 SW. 33rd Way, both of Fort Lauderdale, Fla.
Filed Aug. 22, 1960, Ser. No. 50,891
3 Claims. (Cl. 210—169)

This invention relates to a device for introducing a chlorine solution into the water of swimming pools or the like.

Chlorine, as commonly employed for swimming pools is usually either a powder or a crystal and, chlorine introduced into the swimming pool leaves an objectionable residue that tends to cloud the water and settles as a precipitate to the bottom of the pool where it is difficult to remove.

This invention contemplates an automatic injection device that is actuated by the force of a stream of water entering the pool, to dissolve and filter the chlorine granules and deliver the solution to the pool free of all residue, eliminating the problem of cleaning the pool at frequent intervals.

The invention contemplates a relatively movable container that is supported adjacent to the swimming pool and that receives a filter basket into which the chlorine granules are disposed and with means to conduct under pressure, a stream of water that is sprayed upon the top of a body of the granules within the filter to dissolve the granules, permitting a saturated chlorine solution to pass below the end of the filter basket where it is transferred by suction means to be discharged into the water of the swimming pool, free of all precipitates and discharging into the pool a clear chlorinated solution.

The device embodies a filter having a filter basket and a supporting housing and with the housing being provided with a flaring base that supports the filter in a manner that avoids the danger of accidental upsetting and with the filter basket having a perforated bottom to be covered by a filter pad and a spacer screen that is disposed upon the filter pad to maintain the body of the granules in spaced apart relation to the filter pad to enhance the dissolving action of the water and to permit the flow of chlorine solution from the bottom of the basket where it is drawn outwardly under suction pressure from a conventional garden hose or under the suction influence of water discharging from a conventional pool inlet adaptor.

Novel features of construction and operation of the device will be more clearly apparent during the course of the following desecription, reference being had to the accompanying drawings wherein has been illustrated a preferred form of the device and wherein like characters of reference are employed to denote like parts throughout the several figures.

Figure 2:
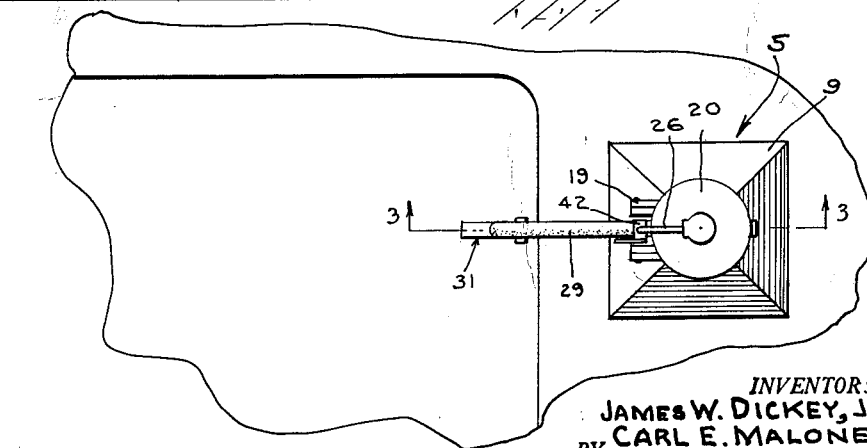

In the drawings:

FIGURE 1 is a fragmentary sectional view through one seide wall of a swimming pool, showing the invention in use therewith, FIGURE 2 is a top plan view of a structure illustrated in FIGURE 1, FIGURE 3 is an enlarged sectional view taken on line 3—3 of FIGURE 2 and, FIGURE 4 is an enlarged longitudinal section of a suction coupling embodied in the invention.

Referring specifically to the drawings, the numeral 5 illustrates a chlorinating filter element as a whole. The filter element is adapted to be supported in resting engagement upon a coping or other element 6 of a swimming pool, closely adjacent to the edge of the pool that supports the water to be chlorinated. The filter element embodies a preferably molded plastics cylindrical shell 7, having an open upper end that is circumferentially beaded, as at 8. The shell 7 is provided with a flaring and preferably square base 9 that sets upon the coping 6. The shell 7 upwardly from its lower end is provided with a preferably conical bottom 10, having an axially arranged and downwardly extending tubular elbow 11.

Disposed within the shell 7 is a slightly conical and preferably molded receptacle 12, having an upper outwardly and downwardly curved lip portion 13 that is adapted to overlie and be supported upon the bead 8. The bottom 14 of the receptacle 12 is preferably perforated at 15 for the passage of dissolved granules of calcium hypochlorite. The bottom 14 of the receptacle 12 is spaced a predetermined distance above the conical bottom 10 of the shell 7. Adapted to be disposed upon the perforated bottom 14 of the receptacle 12, is a filter sheet or pad 16 whereby to filter out the normal residue customarily remaining when the hypochlorite granules are dissolved under the influence of water. Also disposed within the receptacle 12 for resting engagement upon the pad 16, is a relatively fine mesh screen 17. The screen 17 is preferably formed of stainless steel and supported within a suitable frame, that carries spacing legs 18 whereby, to hold the screen 17 in spaced apart relation to the filter pad 16. The screen 17 and the filter pad 16 are of course removable from the receptacle 12 after the granules have been fully dissolved.

Hingedly connected to the shell 7 at one side, as indicated at 19, is a cover plate 20. The cover plate 20 is provided with an inwardly spaced and downwardly extending flange 21, that projects slightly into the receptacle 12 when the device is assembled in operative relation. The cover 20 is latched into engagement with the lip portion 13 by a flexible latch device 22. The cover 20 axially thereof is provided with an upstanding boss 23, that is apertured at 24 to receive a coupling sleeve 25, that has a fluid tight engagement with a flexible and preferably polyethylene tube 26. The aperture 24 communicates with a downwardly extending port 27, that is flared at its lower end as at 28 and directed toward a mass of hypochlorite granules that are disposed within the receptacle 12 in the initial operative arrangement of parts.

Connected with the elbow 11, is a flexible and relatively large tube 29, that extends through an opening 9', in one side wall of the base 9. The tube 29 has connection with a short tubular nipple 30 of a T-coupling and suction member 31, The suction member 31 embodies a horizontal tubular member 32, that is provided at one end with a freely rotatable hose coupling 33. The opposite end of the member 31 is open for the free discharge of chlorinated fluid being drawn from the shell 7, through the elbow 11. The hose coupling 33 may be connected to a conventional garden hose to constitute pressurized flow of water, that creates the suction or, it may be connected to the threaded end 34 of the conventional tubular pool inlet adapter 35. The adaptor 35 is adapted to be used in connection with the usual and well known circulating system of the swimming pool and constitutes a self-sealing connector that is merely inserted into the usual opening of the side wall of the swimming pool to engage the circulating outlet pipe. Fitted within the member 32 and fixedly supported therein in any desirable manner, is a tubular insert 36, that is reduced at its forward end to provide a suction creating jet orifice 37. The reduced end of the element 36 terminates a predetermined distance inwardly from the opening of the nipple 30 whereby the element 36 and its reduced aperture constitutes a jet for the water entering either from the hose or the adaptor 35, to create a suction within the nipple 30 and the tube 29.

Also connected with the element 36 at one side, is a relatively slender feed tube 38, that passes upwardly through the nipple 30 to receive a lower end 39 of a relatively small and preferably plastics feed tube 40, that traverses the inside of the tube 29 and the elbow 11. The tube 40 has connection with a nipple 41, that extends inwardly through one side wall of the shell 7 above the bottom 10. The nipple 41 carries a cutoff valve 42. The valve 42 receives the opposite end of the tube 26, as indicated at 43. It is contemplated, that the entire mechanism, with the exception of the screen 17, shall be formed of plastics of any desirable characteristics.

In the use of the device, the flexible pipe 29 is extended through the aperture 9′ for frictional engagement with the elbow 11. The slender tube 40 is first threaded through the pipe 29, with its upper end extending upwardly into the chamber formed by the conical bottom 10 and frictionally engaged with the nipple 41. The lower end of the tube 29 is frictionally engaged with the nipple 30 while the lower end of the tube 40 is frictionally engaged with the slender feed tube 38. The upper tube 26 is substantially identical in diameter to the tube 40 and its lower end is frictionally coupled to the cut-off valve 42 while its upper extremity passes between the hinge element 19, to be frictionally engaged with the sleeve 25. The cover may be freely swung to the open position, since the tube 26 is flexible. The suction fitting 31 may now be connected to the conventional garden hose or it may be connected to the threads 34 of the pool inlet adaptor 35. The lid 20 is now swung to the open position, with the cut-off valve 42 in the closed position. The receptacle 12 is then lifted from the shell 7, a sheet of filter paper or the like disposed within the bottom 14 to the overlie, the perforations 15 and the screen 17, then disposed in resting engagement with the filter pad 16. The hypochlorite granules may then be disposed into the receptacle 12 either before or after the receptacle is replaced into the shell 7. A predetermined quantity of the granules are disposed within the receptacle in accordance with the size of the pool to be chlorinated and, after the receptacle and its supported granules are disposed within the shell 7, the cover 20 is swung downwardly and latched in closed position by the latch device 22. If the device is connected to the pool adaptor 35, there is a constant flow of water from the circulating system of the pool, such circulating system creating in the member 31 and the nipple 30, a jet suction action that is transferred through the pipe 29 to the chamber below the bottom of the receptacle 12 and upon opening the valve 42, the water passing from either the hose or the adaptor, creates a back pressure due to the reduced nozzle 37 and simultaneously forces a stream of water through the tube 38, the tube 40, the valve 42 and the tube 26, spraying the water downwardly through the aperture 28 upon the surface of the granules. The spray from the aperture 28 will be prevented from possibly passing the lip portion 13, by the flange 21. As the spray continues, the granules are dissolved and the chlorinated liquid passes down through the screen 17, to be filtered by the filter pad 16 and then drips downwardly into the chamber formed by the bottom wall 10 where it is siphoned outwardly by the siphon or suction action of the water being discharged through the member 31, effectively transferring the chlorinated solution for direct injection into the water of the pool. If the device is coupled with the inlet adaptor 35, the flow of water is continuous and, will fully dissolve all of the granules, permitting only the clear filtered chlorinated water to pass outwardly into the pool, collecting all of the residue or such matter from the dissolved crystals. After the crystals have been fully dissolved, the valve 42 is first closed and the cover 20 swung to the open position after which the receptacle 12 removed, permitting the operator to dump the accumulated debris from the receptacle 12, and to permit the removal of the screen 17 and the filter pad 16 at which time the screen 17 may be flushed with clear water and a new filter pad disposed over the perforations of the bottom 14. The device is simple in construction and provides a very definite chlorinating device for swimming pools or the like that requires no attention other than to fill the receptacle 12 with a predetermined quantity of the granules. The device being coupled with the hose or the adaptor is then automatically put in operation and greatly simplifies the injection of the chlorine into the water of the swimming pool that is free from all sediment that would normally create a cloudy condition to the water.

*Summary*

The chlorinator as recited in this application is a highly efficient yet simple mechanical device which has been especially designed to completely and automatically filter and deliver a solution of chlorine directly into the water of a swimming pool. The device is extremely easy to use and enables the average home owner to take advantage of the relatively inexpensive method of handling hypochlorite granules and to automatically dissolve and filter the chlorine solution to the pool water in a clear, clean, filtered chlorine solution, free from all residue, thus eliminating the problem of cleaning the pool water of this objectionable and difficult to remove precipitate. The device utilizes a running stream of water either from the pool inlet or water from an ordinary garden hose. Since it is constructed in entirely suitable plastic and stainless steel, the problem of corrosion is completely eliminated. The device is light weight, inexpensive and portable. Of additional value is the fact that the device may be used very effectively by the owners of the smaller type portable home pools which are commonly used without the benefit and safety of any chlorination.

The device consists primarily of two containers. A large outer or base container with attached floor stand which allows for bottom clearance as well as to provide stability and an inner or filter container. The filter container is open at the top and fits into the base container so that its top edge is flush with the base container. A drainage arrangement or chamber is provided beneath the filter container, the bottom of which serves as a filter pad base and is equipped with numerous drain openings to permit ample drainage from the filter pad through to the collecting drainage chamber below. A hinged cover seals the tops of both containers and a simple snap device holds it securely shut. A relatively large flexible drainage or suction hose has communication with the drainage chamber at one end and is attached at its opposite end to the suction opening of a suction fitting. One purpose of the suction fitting is to provide a positive suction drain under the influence of a stream of water, either from the hose or from the pool inlet while a smaller flexible tube is connected into the suction fitting and to be disposed within the relatively large hose and constitutes a capillary tube through the medium of which water under pressure will be conducted for discharge on to the top of the granules suported within the filter. The suction coupling thus produces a dual function, one to conduct a stream of water to the top of the granules to dissolve and filter downwardly through the bottom of the filter where they are collected and discharge under the influence of the suction hose to be discharged into the water of the pool, all being performed by single water line. It will thus be apparent that there has been provided a very novel and simple device for automatically chlorinating the water within a swimming pool in a simple manner and without discharging any of the preicpitate from the granules into the pool. The device is cheap to manufacture, strong, durable and most effective for the purposes indicated.

It is to be understood that the invention is not limited to the precise construction shown, but that changes are contemplated as readily fall within the spirit of the invention as shall be determined by the scope of the subjoined claims.

Having described our invention, what we claim as new and desire to secure by Letters Patent is:

1. A chlorinator for use in furnishing a chlorine solution automatically to swimming pools that comprises in combination a filter device and a suction coupling, the suction coupling having means for detachable connection to a source of pressurized water, the filter device embodying an upstanding cylindrical shell open at its top and provided with a flaring bottom for resting engagement adjacent to the edge of a swimming pool, a closure cover hingedly conected to the upper end of the shell to close the open end, latch means for holding the cover in the closed position, the shell having a downwardly directed conical bottom that is provided with a centrally arranged outlet coupling, a filter basket in the shell and adapted to be supported upon the upper marginal edge of the shell, the basket having imperforate tapering side walls and a perforated bottom, filter means supported upon the perforated bottom, the said cover being provided centrally thereof with a downwardly directed spray nozzle that is axial to the basket, a relatively large flexible suction tube that is connected to the outlet coupling of the conical bottom and also to the suction coupling, the flow of water through the suction coupling creating a suction to the outlet coupling and a relatively slender flexible feed tube that is connected to the suction coupling to extend upwardly through the first-named tube and into the shell above the conical bottom, the last-named tube being extended through a side wall of the shell for connection with a cut-off valve, a feed tube connected to the valve and to the spray nozzle, the feed tube conducting water under pressure from the suction coupling to the spray nozzle for continuously spraying water upon a mass of granules supported in the basket to dissolve the granules and feeding a solution of chlorine through the perforated bottom to be withdrawn by the suction action of the suction tube.

2. The structure according to claim 1, wherein the filter structure including the shell and the basket are molded from plastics, the said cover being provided with and inwardly arranged and downwardly extending flange that projects slightly into the basket when the cover is in the closed position, a disposable filter pad arranged in overlying position upon the upper side of the perforated bottom and a fine mesh filter screen disposed in overlying relation to the pad and in spaced apart relation.

3. The structure according to claim 1, wherein the suction coupling embodies a tubular nozzle open at its opposite ends, the nozzle at one end being provided with a hose coupling whereby the nozzle may be threadedly connected to a garden hose or to as wimming pool water outlet adapter, the nozzle having a lateral tubular nipple inwardly from one end that has connection with the large suction hose, the nozzle from its coupling end being provided with a tubular insert and with the inner end of the insert being partially closed and provided with a reduced aperture for imparting a jet action to the water passing through the nozzle, the inner end of the insert partially overlying the opening of the nipple, a relatively slender and rigid tube connected into an aperture in one side wall of the insert to extend upwardly through the nipple, the relatively slender feed tube having conection with rigid tube to force water upwardly through the slender feed tube to the spray nozzle.

References Cited in the file of this patent

UNITED STATES PATENTS

| | | |
|---|---|---|
| 2,135,969 | Donaldson | Nov. 8, 1938 |
| 2,137,755 | Glynn | Nov. 22, 1938 |
| 2,304,846 | Pinkerton | Dec. 15, 1942 |
| 2,613,994 | Peters | Oct. 14, 1952 |
| 2,820,701 | Leslie | Jan. 21, 1958 |

FOREIGN PATENTS

| | | |
|---|---|---|
| 582,455 | France | Oct. 15, 1924 |